Dec. 8, 1964     A. STUMVOLL     3,160,297
BOAT TRAILER
Filed Dec. 4, 1962
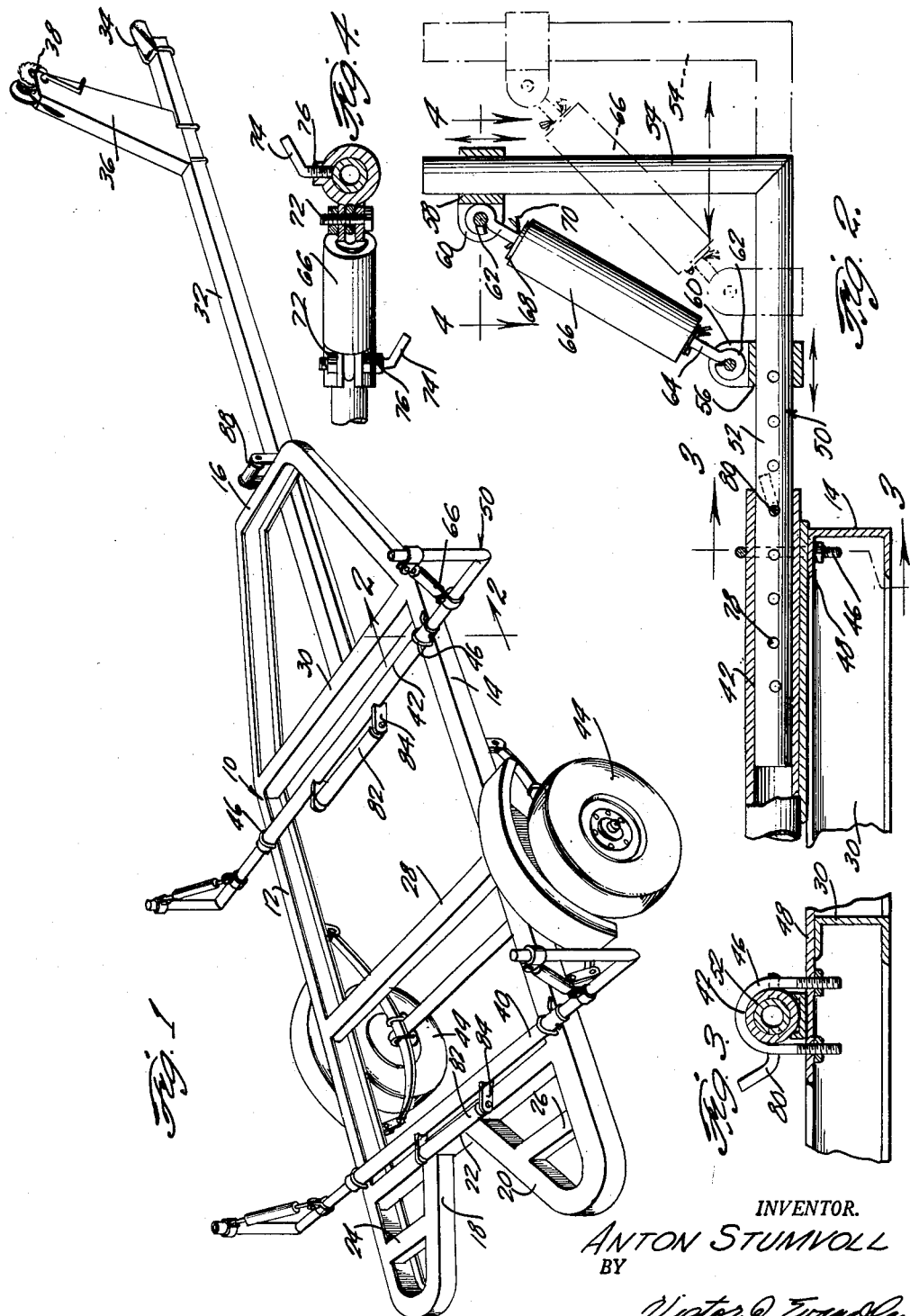
INVENTOR.
ANTON STUMVOLL
BY
*Victor J. Evans & Co.*
*Attorneys*

3,160,297
BOAT TRAILER
Anton Stumvoll, Coleharbor, N. Dak.
Filed Dec. 4, 1962, Ser. No. 242,222
3 Claims. (Cl. 214—84)

The present invention relates to vehicles generally and in particular to a boat trailer of the type employed to transport sail boats, power boats, and the like behind a towing vehicle.

An object of the present invention is to provide a boat trailer which has means for accommodating boats of various widths, this means being with ease and facility adjusted for any size boat, the trailer being constructed sturdily and along simple lines of construction, and one which is highly effective in action.

Another object of the present invention is to provide a boat trailer of unique design and shape, one which is easy to load and unload, one which may be manufactured in such sizes as will accommodate pleasure boats and other crafts of various sizes, and one which is economically feasible.

These and other objects and advantages of the present invention will be fuly apparent from the following description when taken in connection with the annexed drawing, in which:

FIGURE 1 is a perspective view of the boat trailer according to the present invention, FIGURE 2 is a view taken on the line 2——2 of FIGURE 1 and on an enlarged scale, the dotted line showing indicating the adjustable movement of the side roller, FIGURE 3 is a view taken on the line 3—3 of FIGURE 2, and FIGURE 4 is a view taken on the line 4—4 of FIGURE 2.

Referring in greater detail to the drawing in which like numerals indicate like parts throughout the several views, the boat trailer according to the present invention comprises a horizontally disposed frame 10 having side pieces 12 and 14 which merge together at their forward ends and are connected together at their forward ends by a forward piece 16.

A pair of forwardly converging rearward end pieces 18 and 20 have their rearward ends curved and joined to the side pieces 12 and 14, respectively, and have their forward ends merging into and connected together by a frame crosspiece 22.

Other crosspieces 24, 26, 28, and 30 reinforce the frame 10.

A tongue 32 extends forwardly from the crosspiece 30 beneath the latter and beneath the frame piece 16 and is fixedly secured thereto. A hitch component 34 on the forward end of the tongue 32 provides a means by which the trailer is attached to a towing vehicle. A conventional standard 36 with a winch assembly 38 on the upper end thereof rises from the tongue 32 adjacent the hitch 34. An important feature of the present invention resides in a pair of open ended tubular members 40 and 42 arranged in spaced relation transversely of the frame 10 with the member 40 rearwardly of the wheels 44 and with the member 42 forwardly of the wheels 44.

As the members 40 and 42 are identical, they will be described with reference to the member 42.

The member 42 is secured to the frame 10 by means of U-bolts 46 the legs of which extend through the upper flange 48 of the side pieces 12 and 14. The ends of the tubular members 40 and 42 are above and are contiguous to the side pieces 12 and 14.

An L-shaped support 50 is disposed adjacent each end of each of the tubular members 40 and 42. The supports 50 are identical and the long leg 52 of each is slidably and rotatably mounted in the adjacent end portion of the respective tubular member 40, 42.

The short leg 54 of each support 50 is vertical and above the long leg 52.

A collar 56 is slidable upon the portion of the long leg 52 exteriorly of the respective tubular member 40, 42. Another collar 58 is slidable upon the short leg 54. Each collar 56, 58 has upstanding gears 60 between which is pivotally connected an eye formation 62 on each end of a shaft 64. A roller 66 is journaled on the shaft 64 between the eye formations 62 and is secured in place by means of washers 68 and cotter pins 70 engaging the shaft 64.

Bolt and nut assemblies 72 extend through the pairs of ears 60 and the adjacent eye formation 62 and provide a means by which the shaft 64 is secured to the collars 56 and 58. Hand bolts, as at 74 in FIGURE 4, are threaded in bosses 76 in each of the collars 56 and 58, and form a means by which the collars 56 and 58 are releasably locked on the respective portions of the support 50.

The long leg 52 of each support 50 is provided with a plurality of spaced holes 78 through which is selectively engaged another hand bolt 80 for preventing the sliding movement and also preventing the rotary movement of the long leg 52 of each support 50.

Another feature of the invention resides in the provision of rollers 82 disposed rearwardly of each of the members 40 and 42, respectively, and fixedly mounted thereon by means of brackets 84 which have their one ends welded to the adjacent member 40, 42, and are provided with holes at their other ends for the reception therein of the end portions of shafts on which the rollers 82 are journaled.

Another roller 88 is mounted on the frame 10 adjacent the tongue 32 and forwardly of the frame forward piece 16.

In use, the supports 50 may be extended out of the respective tubular members 40 and 42 to accommodate most of various widths and the positions of the rollers 66 may be altered by moving the collars 56 and 58 as suggested in dotted lines in FIGURE 2.

It will be seen therefore that the boat trailer according to the present invention provides means for accommodating boats of various widths and that the supports 50 may be selectively positioned inwardly or outwardly of the frame 10 so that their rollers 66 engage the sides of a boat when supported upon the frame 10.

The rollers 82 and 88 assist in the loading and unloading of a boat on the trailer of the present invention and their rearward position with respect to the adjacent tubular member 40, 42, is such that they engage the keel or bottom of the boat when the latter is rolled onto or off of the frame 10.

While only a preferred embodiment of the present invention has been shown and described other embodiments are contemplated and numerous changes and modifications may be made therein without departing from the spirit of the invention as set forth in the appended claims.

What is claimed is:

1. In a trailer including a tongue adapted to be removably attached to a towing vehicle, and a wheel supported frame extending rearwardly from said tongue the improvement wherein, said frame includes spaced side pieces, a pair of open ended tubular members arranged in spaced relation transversely of said frame and each having each end above and contiguous to the adjacent frame side piece, an L-shaped support disposed adjacent each end of each of said members and having the portion of the long leg adjacent the free end thereof slidably and rotatably mounted in the portion of the adjacent tubular member adjacent the open end thereof, the short leg of each support being vertical and above the long leg, means for releasably locking said long legs in the respective tubular member end portion against sliding and rotary movement, a first collar slidably mounted on the short leg of each of said supports, a second collar slidably mounted on the remainder portion of the long leg of said support, and a roller extending between said first and second collars and rotatably supported thereon.

2. In a trailer including a tongue adapted to be removably attached to a towing vehicle, and a wheel supported frame extending rearwardly from said tongue the improvement wherein, said frame includes spaced side pieces, a pair of open ended tubular members arranged in spaced relation transversely of said frame and each having each end above and contiguous to the adjacent frame side piece, an L-shaped support disposed adjacent each end of each of said members and having the portion of the long leg adjacent the free end thereof slidably and rotatably mounted within the portion of the adjacent tubular member adjacent the open end thereof, the short leg of each support being vertical and above the long leg, means for releasably locking said long legs in the respective tubular member end portion against sliding and rotary movement, a first collar slidably mounted on the short leg of each of said supports, a second collar slidably mounted on the remainder portion of the long leg of said support, a roller extending between said first and second collars and rotatably supported thereon, and means for releasably locking each of said first and second collars against sliding movement.

3. An attachment for a boat trailer comprising a tubular member adapted to be mounted transversely of the boat trailer, said member having open ends, an L-shaped support at each end of said member, each support including one leg movably received within the end of said tubular member, means releasably interconnecting said one leg of the support and the tubular member, an inclined roller supported between the leg of each support and bridging the juncture therebetween for providing rolling and guiding engagement with a boat hull when the boat is pulled onto the boat trailer, said inclined roller is supported between two collars slidably received on said legs, means to lock the collars adjustably in position on the legs for varying the inclination of the inclined roller.

References Cited by the Examiner
UNITED STATES PATENTS

| | | | |
|---|---|---|---|
| 2,848,126 | 8/58 | Taylor | 214—84 |
| 2,968,413 | 1/61 | Heckman | 214—505 |
| 3,021,969 | 2/62 | Peake et al. | 214—505 |
| 3,056,520 | 10/62 | Rutigliano | 214—505 |
| 3,083,986 | 4/63 | Moody et al. | 280—414 |

HUGO O. SCHULZ, *Primary Examiner.*

GERALD M. FORLENZA, *Examiner.*